United States Patent
Young (10) Patent No.: US 10,069,757 B1
(45) Date of Patent: Sep. 4, 2018

(54) RESERVED NETWORK DEVICE CAPACITY

(71) Applicant: AMAZON TECHNOLOGIES, INC., Reno, NV (US)

(72) Inventor: Lawrence Shao-Shien Young, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 295 days.

(21) Appl. No.: 14/738,682

(22) Filed: Jun. 12, 2015

(51) Int. Cl.
*G06F 15/173* (2006.01)
*H04L 12/911* (2013.01)

(52) U.S. Cl.
CPC .......... *H04L 47/822* (2013.01); *H04L 47/827* (2013.01)

(58) Field of Classification Search
CPC .......... G06F 3/0665; G06F 9/50; G06F 9/505; G06F 9/5066; G06F 9/5088; H04L 12/5695; H04L 47/822; H04L 47/823; H04L 47/827; H04L 67/02; H04L 67/1002; H04L 67/1008; H04L 67/1023; H04L 67/1029; H04L 67/2842; H04L 69/329
See application file for complete search history.

(56) References Cited

U.S. PATENT DOCUMENTS

| | | | | |
|---|---|---|---|---|
| 5,719,854 A * | 2/1998 | Choudhury | ........... | G06F 9/5027 370/231 |
| 7,369,981 B1 * | 5/2008 | Saghier | ............... | G06F 11/3409 702/179 |
| 8,032,634 B1 * | 10/2011 | Eppstein | ................ | H04L 67/34 709/226 |
| 8,296,434 B1 * | 10/2012 | Miller | ................ | H04L 67/1029 709/220 |
| 8,443,077 B1 * | 5/2013 | Lappas | ................ | G06F 9/5077 709/224 |
| 8,650,299 B1 * | 2/2014 | Huang | ................ | G06F 9/5077 709/226 |
| 2006/0277305 A1 * | 12/2006 | Bernardin | ............. | G06Q 10/06 709/226 |
| 2007/0094662 A1 * | 4/2007 | Berstis | .................... | G06F 9/505 718/102 |
| 2012/0144008 A1 * | 6/2012 | Yuyitung | ............. | G06F 9/5066 709/223 |

\* cited by examiner

*Primary Examiner* — Christopher Biagini
(74) *Attorney, Agent, or Firm* — Blank Rome LLP (57) ABSTRACT

A web services system includes a plurality of computing nodes, each comprising a processor and memory coupled to the at least one processor. The computing nodes include a network device and a management service. The network device is configured to receive service requests directed to an application. The management service allocates resources to the network device, and is configured to measure usage of a plurality of different types of the resources by the network device, and to determine a value of resource utilization for the network device. The value is expressed according to a standard that represents all the different types of the resources, and the value is selected based on one of the different types of the resources that is most highly utilized by the network device.

22 Claims, 8 Drawing Sheets

RESERVED NETWORK DEVICE CAPACITY

BACKGROUND

In network-based computing environments, multiple computers may be employed to manage incoming service requests. Load balancers may be used to distribute the service requests across the multiple computers. Distributing the service requests across the computers helps optimize resource utilization, maximize throughput, and avoid overload of any one of the computers. Typically, a load balancer receives a request from a client device, selects one of the multiple computers to service the request, and routes the request to the selected computer, which processes the request and issues a response. Load balancers generally attempt to distribute the request load evenly across all of the service computers in an effort to prevent any individual computer from being overloaded with requests.

BRIEF DESCRIPTION OF THE DRAWINGS

For a detailed description of various examples, reference will now be made to the accompanying drawings in which.

DETAILED DESCRIPTION

The present disclosure is directed to technologies for managing the computing resources allocated to a network device, such as a network address translator, load balancer, etc. More specifically, the network device disclosed herein is configured to provide timely response to abruptly changing request loads. Embodiments of the network device include a selectable amount of reserved computing capacity that can be instantaneously applied to process a sudden increase in traffic. Embodiments also apply a technique of tracking network device resource utilization that measures network device resource use in standard units that reflect a predetermined quantity of the various computing resources utilized by the network device.

In a web-based computing system, the network traffic (e.g., number of requests) directed to a particular application, and to the computers that execute the application, can vary over time. For example, the number of requests directed to an application may increase or decrease at various times based on the number of clients attempting to access the application. To address such variation in load, a web service provider may automatically scale the amount of computing resources dedicated to an application, i.e., scale the amount of resources dedicated to servicing requests directed to the application, based on the number of requests, or based on the utilization of the computing resources available to the application for responding to the requests. For example, if computing resources currently allocated to an application are 70% utilized to service incoming requests, then additional computing resources may be allocated to the application to reduce the overall resource utilization to 60%. Similarly, if computing resources currently allocated to an application are 30% utilized to service incoming requests, then computing resources may be deallocated from the application to increase the overall resource utilization to 50%. By adjusting the amount of computing resources allocated to an application in this manner quality of service can be maintained while minimizing overall expense.

A customer of a web service provider may execute instances of an application via virtual machines, where the virtual machines are executed by one or more computers. The web service provider may allocate additional computing resources to the application by creating one or more additional virtual machines and executing an instance of the application in each of the newly created virtual machines. The web service provider may deallocate computing resources from the application by halting a virtual machine, and associated application instance, and freeing the computing resources for reallocation as needed.

As noted above, a load balancer may be applied to distribute service requests across the various instances of the application. As for the application associated with the load balancer, the web service provider may scale the computing resources allocated to the load balancer to allow the load balancer to provide timely processing of service requests under changing load conditions. For example, if computing resources currently allocated to a load balancer are 70% utilized to route incoming requests, then additional computing resources may be allocated to the load balancer to reduce the overall resource utilization to 60%. Similarly, if computing resources currently allocated to the load balancer are 30% utilized to route incoming requests, then computing resources may be deallocated from the load balancer to increase the overall resource utilization to 50%. The web service provider may scale up (i.e., increase) the amount of computing resources dedicated to the load balancer by creating an additional virtual machine and executing an additional instance of the load balancer in the newly created virtual machine. The web service provider may deallocate computing resources from the load balancer by halting a virtual machine, and associated load balancer instance, and freeing the computing resources associated with the virtual machine for reallocation as needed.

In some situations, the amount of traffic received by a network device may change substantially in a relatively short time. If traffic substantially and abruptly increases (e.g., an instantaneous increase of 100%), then the web service provider may be unable to allocate additional resources to the load balancer quickly enough to maintain a desired quality of service. As a result, processing of traffic may be delayed and overall request service time may be unduly extended. The network device service disclosed herein overcomes this deficiency by reserving computing capacity for use by the network device, and applying the reserved computing capacity to process abrupt increases in request loading. The reserved computing capacity associated with a network device includes a selectable amount of computing resources that are dedicated to the network device. The amount of reserved computing capacity allocated to the network device may be selected based on loading of the network device as measured during operation, and may be changed at any time as needed. When the computing resources needed by the network device to route service requests fall below the reserved computing capacity, the web service provider does not allow the computing resources allocated to the network device to be decreased below the amount of resources defined by the reserved computing capacity. That is, the web service provider halts deallocation of computing resources from the network device when a minimum resource threshold defined by the reserved computing capacity is reached. By maintaining the reserved computing capacity, the network device can maintain quality of service and provide timely processing of service requests if the service request traffic increases abruptly.

To facilitate selection of an amount of reserved computing capacity, the web service provider monitors the utilization of computing resources by the network device over time. Via the resource utilization monitoring, the web service provider can determine a maximum amount of computing resources utilized by the network device over time and advise a party controlling the network device with regard to selection of reserved computing capacity.

The network device utilizes a number of different computing resources to process traffic. For example, the computing resources utilized include processor capacity, memory, secondary storage, network bandwidth, etc. Monitoring of network device resource utilization includes measuring use of each of these different computing resources. The measurements may be expressed in a standard unit that specifies a predetermined amount of each of the different resources. For example, one standard unit of computing resources may specify a predetermined amount of processor capacity, a predetermined amount of volatile memory, a predetermined amount of secondary storage, and a predetermined number of network transfers over a predetermined time interval. The web service provider may express each different measured computing resource in terms of the standard units of computing resources. Consequently, each different computing resource utilized by the load balancer may require a different number of standard units of the computing resources. By identifying the different number of standard units of computing resources needed to satisfy each different computing resource utilized, the web service provider can identify which of the resources is most highly utilized. That is, the web service provider can identify which of the different computing resources utilized required the most standard units of the computing resources over time, and in turn the web service provider can identify the maximum number of standard units of the computing resources needed to process traffic over time.

Having identified the maximum number of standard units of computing resources, the web service provider can advise a party associated with the network device, e.g., a customer of the service provider. Being informed of the measured resource utilization, the party can select a number of the standard units of computing resources to serve as reserved computing capacity. On receipt of a selected number of standard units of computing resources to reserve, the web service provider can allocate the reserved computing capacity to the party. In this manner, the network device service disclosed herein can overcome the issues associated with delayed resource allocation exhibited by other services.

While techniques for reserving computing resources are illustrated primarily herein with respect a load balancer, the computing resource reservation techniques disclosed herein are application to a wide variety of network devices. A load balancer is only one example of such a network device. Examples of other network devices to which the computing resource reservation techniques disclosed herein may be applied include network address translators and other devices that process network traffic in a web services system.

Figure 1:
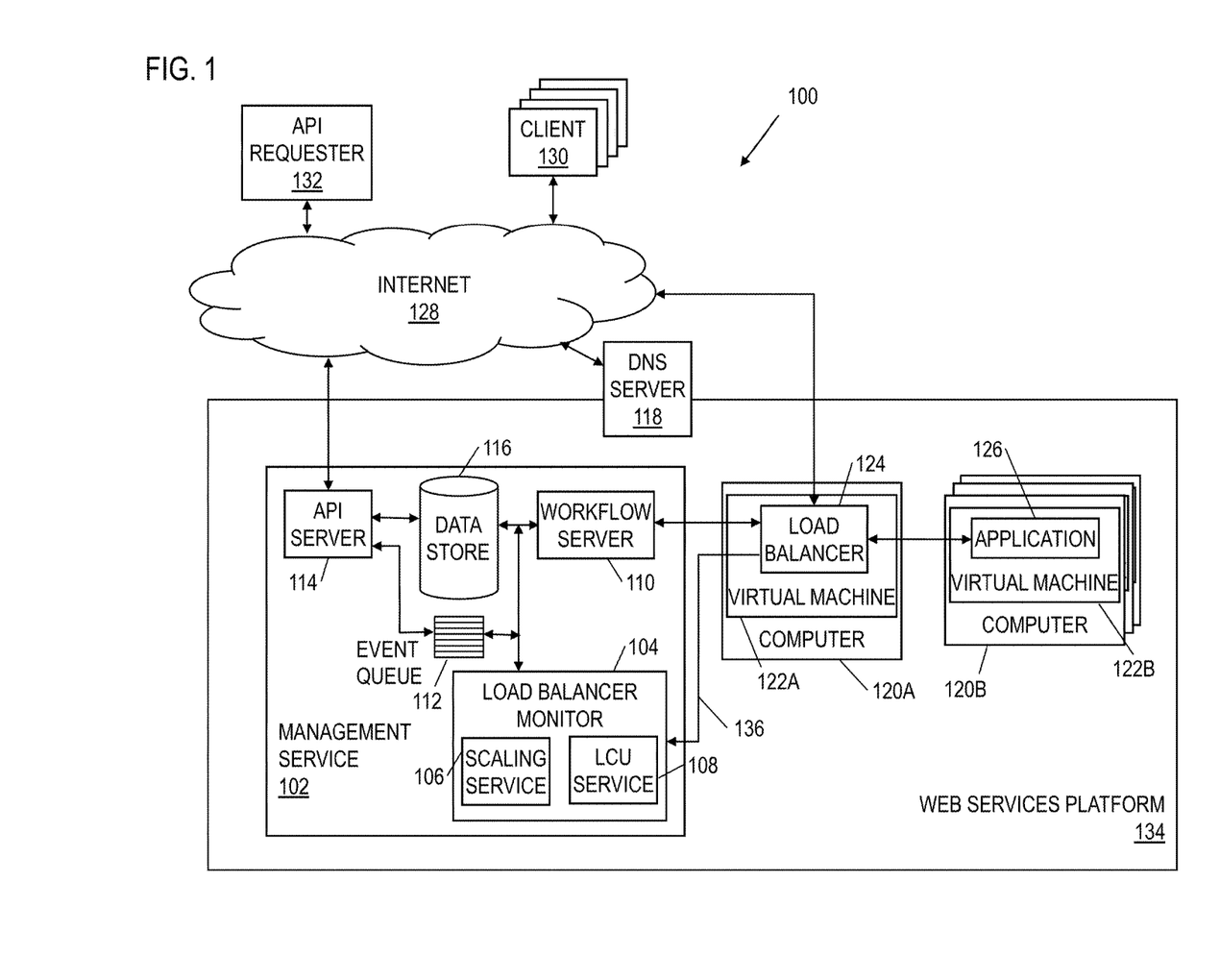
FIG. 1 shows a schematic diagram of a system architecture that provides load balancing with reserved capacity in accordance with various embodiments.

FIG. 1 shows a schematic diagram of a system architecture 100 that provides load balancing with reserved capacity in accordance with various embodiments. The system architecture 100 includes a web services platform 134 that communicates with an application programming interface (API) requestor 132 and one or more clients 130 via the Internet 128. The API requestor 132 is a management entity that provides control information to the web services platform 134, and receives status information from the web services platform 134. The API requestor 132 may be a management console presented in a web browser executed by a computer, a command line interface executed by a computer, an automated management system or script executed by a computer, etc. A customer (e.g., a business entity) of a web services provider may utilize the API requestor to receive status information from the web services platform 134 and to provide control information to the web services platform 134.

The clients 130 are computing devices that request services from an application executed by the web services platform 134. A computing device suitable for use as an API requestor 132 or client 130 may be a desktop computer, a laptop computer, a tablet computer, a smartphone, or other computing device.

The domain name service (DNS) server 118 stores DNS records that may include network addresses (e.g., internet protocol (IP) addresses) of servers that correspond to domain names. For example, DNS server 118 may receive hypertext transfer protocol (HTTP) requests from clients 130 for IP addresses via which services provided by the web services platform 134 may be accessed. On receipt of such a request, the DNS server 118 may perform a look-up function and return IP addresses to the clients 130.

The web services platform 134 includes a plurality of computers arranged to execute applications 126 that provide services to the clients 130. The web services platform 134 includes a plurality of computers 120 (120A, 120B, etc.). The web services platform 134 may execute multiple instances of the application 126 to provide a desired quality of service to the clients 130. In an example embodiment, the web services platform 134 executes each instance of the application 126 in a virtual machine 122B or a container (not illustrated). Each virtual machine 122 is executed by a computer 120B. As each additional instance of the application 126 is created, the web services platform 134 allocates a computer 120B to the application, creates an instance of the virtual machine 122B on the computer 120B, and executes the instance of the application 126 on the virtual machine 122B. By varying the number of instances of application 126 executing on a virtual machine 122B, the web services platform 134 scales the computing resources dedicated to the application 126 as needed to provide a desired quality of service.

To control routing of requests received from the clients 130 to the instances of the application 126, the web services platform 134 instantiates a load balancer 124. The load balancer 124 is executed in a virtual machine 122A by a computer 120A. The web services platform 134 scales load balancer 124 by increasing or decreasing the number of virtual machines 122A executing an instance of the load balancer 124. As the number of virtual machines 122A changes, the amount of computing resources applied to execute the virtual machines 122A also changes. The load balancer 124 may distribute request traffic to the applications 126 by random selection, round robin distribution, or may implement one or more algorithms to distribute traffic. For example, for routing requests, the load balancer 124 may take into account factors, such as an application's reported load, recent response times, number of active connections, geographic location, number of requests an application has recently been assigned, etc.

The web services platform 134 includes a management service 102 that controls operation and scaling of the load balancer 124. The management service 102 includes an API server 114, a data store 116, an event queue 112, a workflow server 110, and a load balancer monitor 104. The API server 114 receives requests from the API requester 132 and configures the management service 102 to execute the requests. For example, the API server 144 may receive a request to create a load balancer 124, modify the load balancer 124, configure the load balancer 124, etc. On receipt of a request from the API requestor 132, the API server 114 may store parameters received as part of the request in the data store 116. The data store 116 provides persistent storage for parameters of the load balancer 124 and can be implemented using a database or database service or a block or object store. Parameters received as part of a request may include parameters for configuring the load balancer 124, a request identifier, an identifier for the customer and parameters specific for the load balancer 124. For example, the parameters may include an amount of computing resources to reserve for use by the load balancer 124. The API server 114 may also store an event flag in the event queue 112 to indicate that an operation is to be performed with respect to the load balancer 124. The event queue 112 stores flags that trigger the workflow server 110 to perform an operation.

The workflow server 110 manages the load balancer 124 based on the information stored in the data store 116. For example, the workflow server 110 may create a virtual machine 122A and an instance of the load balancer 124 as needed to route requests received from the clients 130, modify existing instances of the load balancer 124, etc. based on the information stored in the data store 116. In a specific example, this can include configuring the workflow server 110 with executable code that causes it to access the data store 116 and/or the event queue 112 to check for new requests. The workflow server 110 monitors the event queue 112 for flags indicating that an operation affecting the load balancer 124 is to be performed. If the workflow server 110 reads an event flag from the event queue 112, the workflow server 110 may perform operations to configure the load balancer 124 as indicated by the parameters stored in the data store 116. For example, in response to reading an event flag from the event queue 112, the workflow server 110 may reserve and assign an amount of computing resources for use by the load balancer 124.

Figure 8:
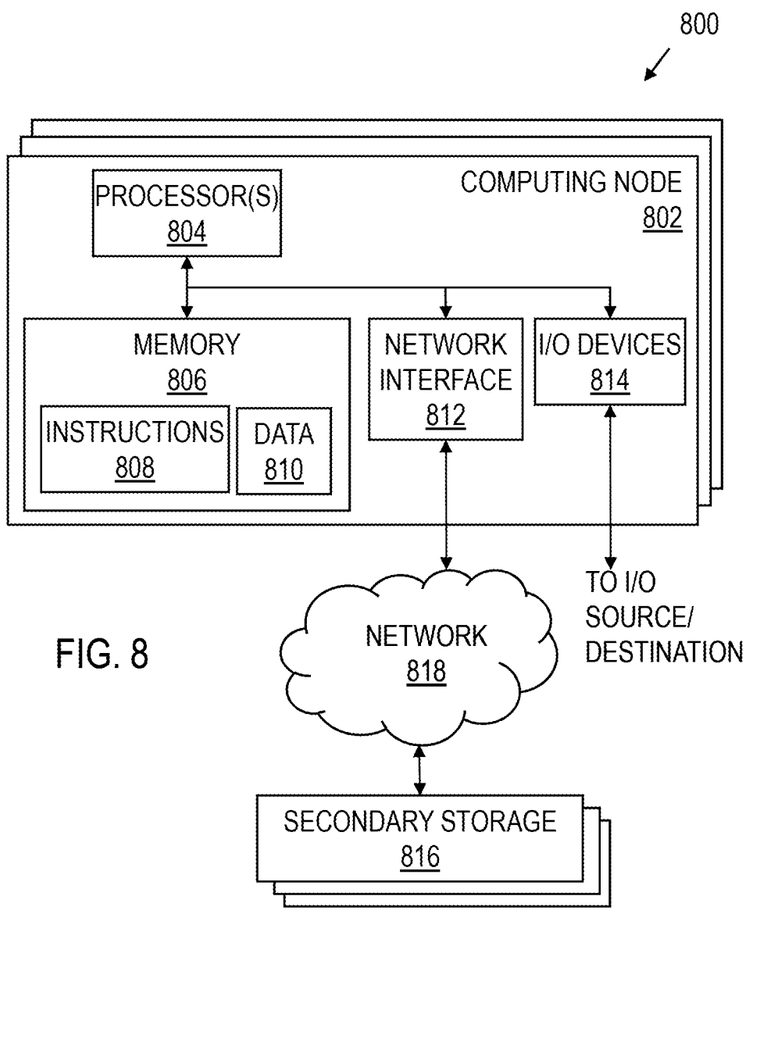
FIG. 8 shows a schematic diagram for a computing system suitable for implementation of a variable capacity load balancer with reserved resources in accordance with various embodiments.

The load balancer monitor 104 tracks the operation of the load balancer 124 to measure an amount of computing resources utilized by the load balancer 124 to service requests received from the clients 130, and adjusts the amount of computing resources allocated to the load balancer 124 based on the measured resource utilization. For example, the load balancer monitor 104 may include its own data store (not illustrated) or use data store 116 to store metrics associated with the computing resources utilized by the load balancer 124. Each load balancer can be assigned an internal identifier, a customer identifier (identifying the customer associated with the load balancer), metrics for the load balancer, etc. The computing resources utilized by the load balancer 124 include processor capacity, memory, secondary storage, and network bandwidth. The computing resources are allocated to the load balancer 124 via the computer 120A. An example of a computer and the types of computing resources applied to implement the load balancer 124 are shown in FIG. 8.

The load balancer monitor 104 includes scaling service 106 and load balancer capacity unit (LCU) service 108. The scaling service 106 determines an amount of computing resources to allocate to the load balancer 124 based the amount of computing resources utilized by the load balancer 124 to process service requests received from the clients 130. The amount of computing resources utilized by the load balancer 124 to process the requests is determined by the LCU service 108. The LCU service 108 measures the utilization of each of a plurality of different types of computing resources applied by the load balancer 124. For example, LCU service 108 may measure use of processor resources, memory resources, network resources, etc. by the load balancer 124 to process requests received from the clients 130.

Measurements of each different type of computing resource applied by the load balancer 124 are expressed in LCUs. An LCU is a standard resource capacity unit that reflects and quantifies an amount of each of the computing resources utilized by the load balancer 124. One LCU may represent a predetermined amount of processor capacity, a predetermined amount of volatile memory, a predetermined amount of non-volatile storage, a predetermined amount of network bandwidth, etc. For example, one LCU may represent processor capacity equivalent to a selected microprocessor, a selected number of gigabytes of volatile memory, a selected number of gigabytes of secondary storage, and a selected number of network transfers per second.

In the web services platform 134, compute resources may be provided in packages, termed compute instances. Multiple different types of compute instances may be provided, and each different type of compute instance may provide an amount of processor capacity, an amount of volatile memory, an amount of non-volatile storage, etc. For example, a type of compute instance designated as "large" may provide processor capacity X, volatile memory—Y GB; non-volatile storage—Z GB, a type of compute instance designated as "x-large" may provide processor capacity 2*X, volatile memory—2*Y GB; non-volatile storage—2*Z GB, a type of compute instance designated as "xx-large" may provide processor capacity 4*X, volatile memory—4*Y GB; non-volatile storage—4*Z GB, etc. In some embodiments of the web services platform 134, an LCU may represent the computing resources provided by the "large" compute instance, so 2 LCUs may represent the computing resources provided by 2 large compute instances (or the "x-large" compute instance if the x-large instance is twice as "large" as a large instance). Some embodiments of the web services platform 134 may provide different and/or additional compute instances. Similarly, the resources represented by an LCU may differ in various embodiments of the web services platform 134.

As noted above, the LCU service 108 determines the amount of computing resources utilized by the load balancer 124, and the scaling service 106 determines an amount of computing resources to allocate to the load balancer 124 based the amount of computing resources utilized by the load balancer 124. The load balancer 124 may include an agent that measures utilization of computing resources by the load balancer 124. For example, such an agent may periodically measure utilization of processor resources, volatile and non-volatile storage, and network access by the load balancer 124 and transfer resource utilization measurements 136 to the load balancer monitor 104.

The LCU service 108 calculates the number of LCUs utilized (i.e., LCU utilization values) by the load balancer 124 based on the resource utilization measurements 136. The LCU utilization values may be provided to the scaling service 106 for use in adjusting the amount of resources allocated to the load balancer 124. LCU utilization values may also be provided to a customer associated with the load balancer 124 to aid the customer in understanding load balancer resource utilization and in selecting an amount of computing resource capacity to be reserved for use by the load balancer 124.

The LCU service 108 may calculate LCU utilization based on the resource utilization measurements 136 by identifying the computing resource most highly utilized by the load balancer 124 and computing the number of LCUs corresponding to the utilization of the most highly used resource. For example, if an "x-large" compute instance (corresponding to 2 LCUs) has been allocated to the load balancer 124, and the resource utilization measurements 136 indicate that the load balancer 124 is utilizing 45% of the available processor resources, 40% of the available volatile memory, 35% of the available non-volatile memory, and 25% of the available network resources, then the LCU service 108 may compute LCU utilization for the load balancer 124 as:

$$0.45 \times 2 = 0.9 \text{ LCUs,}$$

where:
at 45% utilization, processor resources are the most highly used of the measured resources; and 2 LCUs are allocated to the load balancer 124.

In some embodiments of the LCU Service 108, LCU utilization may be computed as the average of the various resource utilization values included in resource utilization measurements 136, the median of the various resource utilization values included in resource utilization measurements 136, or other statistical function of the various resource utilization values included in resource utilization measurements 136.

Figure 7:
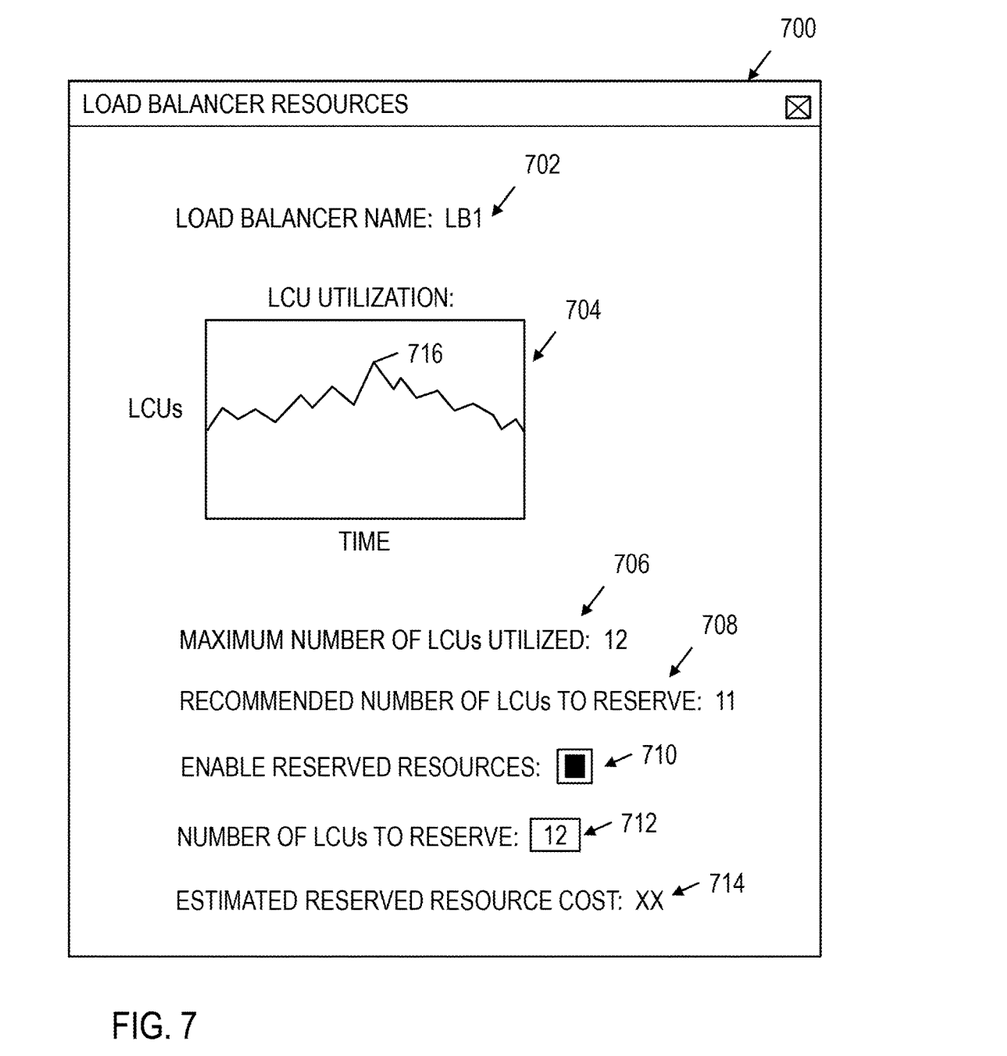
FIG. 7 shows a dialog that displays measured load balancer resource utilization and allows entry of a load balancer resource reservation in accordance with various embodiments.

The LCU Service 108 tracks the computing resource utilization of the load balancer 124 (LCUs) over time, and from the resource utilization tracked over time, the LCU service 108 determines the maximum resource utilization of the load balancer 124 over time. The LCU service 108 may store the maximum LCU utilization, LCU measurements made over time (e.g., as a time series), average LCU utilization over time, etc. in the data store 116, and the API server 114 may provide the LCU measurements to the API requester 132 as a report of load balancer 124 resource utilization. An example of such reporting is shown in FIG. 7.

The scaling service 106 monitors the LCU utilization values generated by the LCU Service 108 and periodically adjusts the amount of computing resources allocated to the load balancer 124 to accommodate changes in loading. For example, the scaling service 106 may read LCU utilization values from the data store 116, or the LCU service 108 may transfer LCU utilization values directly to the scaling service 106, and the scaling service 106 may adjust the amount of computing resources allocated to the load balancer 124 based on the LCU utilization values. In some embodiments, for a given number of LCUs of computing resources assigned to the load balancer 124, if the amount (e.g., the percentage) of the resources utilized by the load balancer 124 exceeds a predetermined threshold amount (60%, 70%, etc.), then the scaling service 106 may allocate additional computing resources to the load balancer 124. Similarly, if the amount (e.g., the percentage) of the resources utilized by the load balancer 124 falls below a predetermined threshold amount (20%, 30%, etc.), then the scaling service 106 may deallocate computing resources from the load balancer 124.

A customer associated with the load balancer 124 may specify various parameters that control the operation of the scaling service 106. Such parameters may be stored in the data store 116 (e.g., in association with other parameters applicable to the load balancer 124) and referenced by the scaling service 106 to manage adjustments to the resources of the load balancer 124. For example, a customer may specify a minimum and/or maximum number of LCUs to be allocated to the load balancer 124, a number of LCUs to be reserved for use by the load balancer 124, threshold values applied to trigger adjustment of resource allocation, etc. Each customer may independently assign such parameters to each load balancer 124. An example of specification of an amount of resources to be reserved for use by the load balancer is shown in FIG. 7.

Changing the amount of computing resources allocated to the load balancer 124 may include changing a parameter recorded in the data store 116 that specifies the amount of load balancer computing resources and adding an event flag to the event queue 112. The workflow server 110 detects the event flag, identifies the changed amount of load balancer computing resources recorded in the data store 116, and allocates or deallocates computing resources from the load balancer 124 in accordance with resource parameters recorded in the data store 116. Allocation of additional resources to the load balancer 124 may cause the workflow server 110 may create additional virtual machines 122A and instances of the load balancer 124, while deallocation of resources from the load balancer 124 may cause the workflow server 110 free or remove from service instances of the virtual machine 122A and load balancer 124.

In the web services platform 134, computing capacity (i.e., computing resources) can be reserved for and dedicated to use by the load balancer 124. Reservation of computing resources for use by the load balancer 124 may be requested by the API requestor 132. The amount of computing resources to be reserved for use by the load balancer 124 may be specified in LCUs. On receipt of a request to reserve computing resources for use by the load balancer 124, the API server 114 may record, in the data store 116, the amount of computing resources to be reserved for use by the load balancer 124 and add an event flag to the event queue 112. The workflow server 110 detects the event flag, identifies the amount of computing resources to be dedicated to the load balancer 124 as recorded in the data store 116, and allocates computing resources to the load balancer 124 in accordance with the resource reservation recorded in the data store 116.

For example, if one LCU is allocated to the load balancer 124, and the resource reservation recorded in the data store 116 specifies that two LCUs should be reserved for use by the load balancer 124, then the workflow server 110 will allocate an additional LCU of computing resources to the load balancer 124 irrespective of whether the additional computing resources are currently needed to service requests received from the clients 130.

In operation, as explained above, the computing resources allocated to the load balancer 124 may be increased or decreased as needed to provide routing of requests received from the clients 130. If computing resources are reserved for use by the load balancer 124, then the workflow server 110 will maintain allocation of at least the reserved amount of computing resources to the load balancer 124. Consequently, if the load balancer monitor 104 determines that the amount of computing resources needed by the load balancer 124 to route requests is less than the amount of computing resources reserved for use by the load balancer 124, then the workflow server 110 will not deallocate the reserved resources from the load balancer 124. In this way, if the quantity of requests received from the clients 130 abruptly increases, the load balancer 124 may apply the reserved computing resources to provide timely servicing of the requests.

Figure 2:
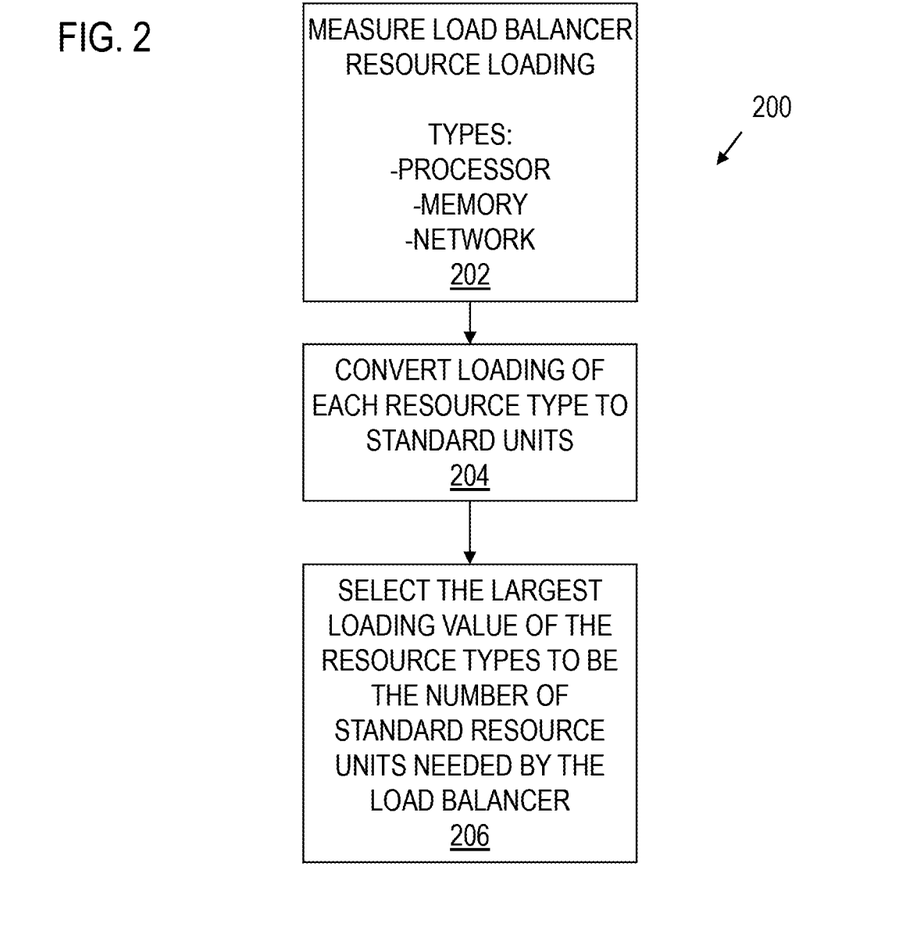
FIG. 2 shows a flow diagram for a method for determining resource utilization of a load balancer in accordance with various embodiments.

FIG. 2 shows a flow diagram for a method 200 for determining and quantifying resource utilization of a load balancer 124 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 200 may be provided by instructions executed by a computer of the web service platform 134.

In block 202, the load balancer 124 is receiving traffic from the clients 130 and routing the traffic to the applications 126. The load balancer monitor 104 measures the loading of computing resources allocated to the load balancer 126 due to the traffic. The measuring includes measuring the utilization of different types computing resources applied by the load balancer 124. For example, the load balancer monitor 104 may measure utilization of processor capacity, memory, network bandwidth, and other types of computing resources used by the load balancer 124.

In block 204, the load balancer monitor 104 converts the measured utilization of each different type of computing resource to LCUs. Because each different type of computing resource may be utilized by the load balancer 124 to a different degree, a different number of LCUs may be required to provide the measured amount of each different type of computing resource. The number of LCUs allocated to the load balancer 124 is known to the load balancer monitor 103, and the number of LCUs utilized to provide each different computing resource of the load balancer 124 can be computed based on the measured utilization of each different computing resource.

In block 206, the load balancer monitor 104 selects the largest of the LCU values computed for the load balancer computing resource utilization measurements to be the number of LCUs utilized by the load balancer 124.

Figure 3:
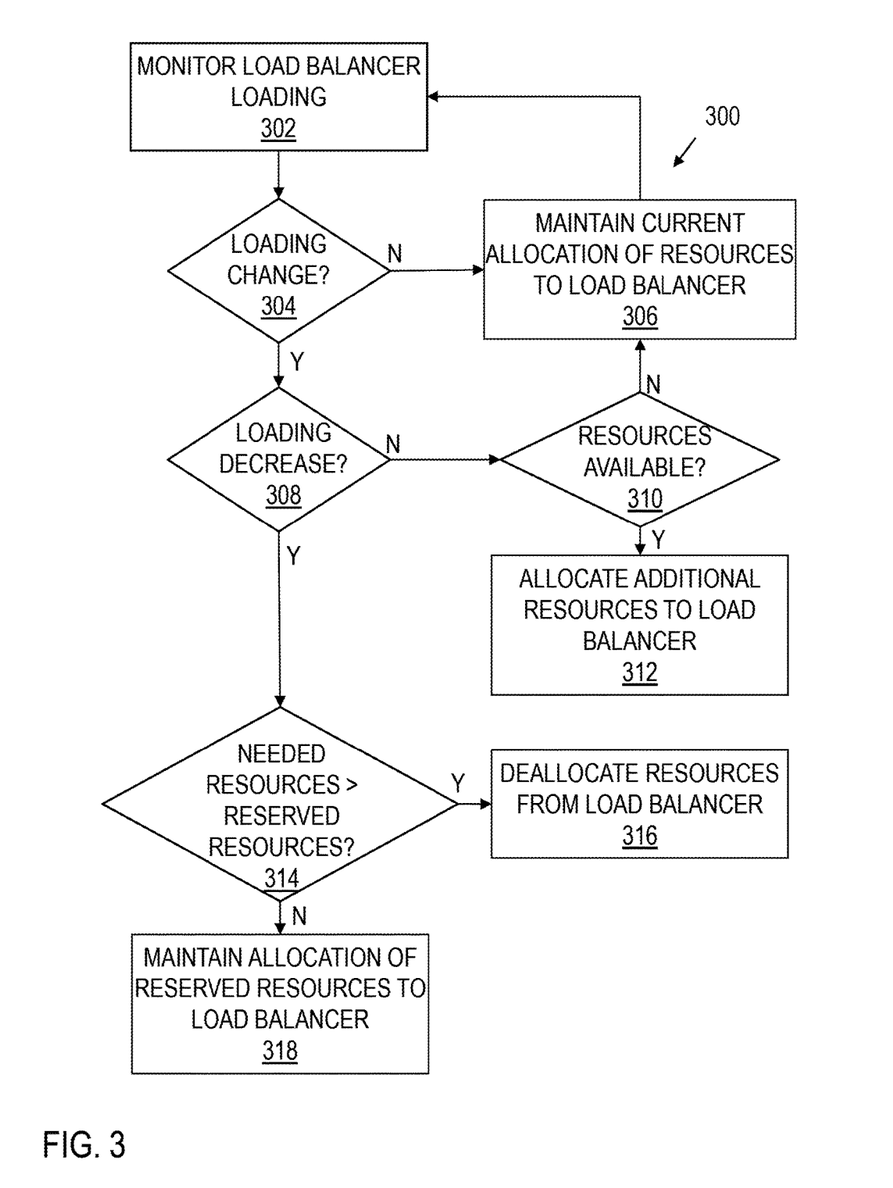
FIG. 3 shows a flow diagram for a method for controlling an amount of resources allocated to a load balancer in accordance with various embodiments.

FIG. 3 shows a flow diagram for a method 300 for controlling an amount of resources allocated to a load balancer 124 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the web service platform 134. In the method 300, an amount of computing capacity (e.g., a specific number of LCUs of computing capacity) has been reserved for use by the load balancer 124, and the load balancer 124 is routing service requests received from the clients 130 to the instances of the application 126 for servicing.

In block 302, the load balancer monitor 104 is monitoring loading of the load balancer 124. The monitoring includes measuring the utilization, by the load balancer 124, of various computing resources as described in method 200.

In block 304, the load balancer monitor 104 determines whether the loading of the load balancer 124 has changed. Such a determination can be made by comparing a most recent load balancer computing resource utilization value to one or more load balancer computing resource utilization values determined prior to the most recent load balancer computing resource utilization value. If the loading of the load balancer 124 has not changed or has changed less than a configured amount, then the current allocation of computing resources to the load balancer 124 is maintained (i.e., unchanged) in block 306. For example, the load balancer monitor 104 may leave unchanged the parameters of the load balancer 124 stored in data store 116.

If the loading of the load balancer 124 has changed, then in block 308, the load balancer monitor 104 determines whether the loading has decreased relative to previous measurements of load balancer 124 loading. If the loading has not decreased, but rather has increased, the load balancer monitor 104 determines whether additional computing resources are needed by the load balancer 124 to process the increased load. In some situations the loading of the load balancer 124 may increase and the computing resources reserved for use by the load balancer 124 are sufficient to process the increased load without allocation of additional computing resources. In such situations, the load balancer monitor 104 may not change the parameters of the load balancer 124 stored in the data store 116, and the then the amount of computing resources currently allocated to the load balancer 124 is maintained. For example, a threshold for increasing resource allocation (e.g., 80% utilization, 90% utilization, etc.) may be specified by a customer or other entity associated with the load balancer 124. If the loading has increased to a level that is below the threshold, then the load balancer monitor 124 may not increase the amount of computing resources allocated to the load balancer 124. On the other hand, if the loading has increased to level that exceeds the threshold, then the load balancer monitor 124 may increase the amount of computing resources allocated to the load balancer 124 to insure that the load balancer 124 has sufficient resources to process the increased traffic.

If additional computing resources are needed by the load balancer to process the increased load, then the load balancer monitor 104 determines an amount of computing resources needed by the load balancer 124 to process the increased request load. As explained above, if an increase in loading does not result in a level of loading that exceeds a utilization threshold, then no additional resources may be needed to satisfy the increased loading. On the other hand, if the loading has increased beyond a threshold, then, in some embodiments, the load balancer monitor 104 may be configured to allocate a selected amount of additional resources to the load balancer 124. For example, if the utilization threshold is exceeded, then the load balancer monitor 104 may determine that an additional LCU of resources is to be allocated to the load balancer 124. In some embodiments, if the resource utilization continues to exceed the threshold notwithstanding the allocation of the selected amount of additional resources to the load balancer 124, then the load balancer monitor 104 may determine that more than (e.g., twice) the selected amount of resources are to be allocated to the load balancer 124.

In block 310, the load balancer monitor 104 determines whether the additional computing resources needed to process the increased request load are available for allocation to the load balancer 124. If the additional computing resources are not available for allocation to the load balancer 124, then the amount of computing resources currently allocated to the load balancer 124 is maintained in block 306.

If the additional computing resources needed to process the increased request load are available for allocation to the load balancer 124, then, in block 312, the load balancer monitor 104 updates the parameters of the load balancer 124 stored in the data store 116 to reflect the allocation of the additional resources to the load balancer 124, and adds an event flag to the event queue 112. The workflow server 110 detects the event flag and allocates the additional computing resources to the load balancer 124. For example, the workflow server 110 may allocate the additional computing resources by instantiating one or more additional virtual machines 122A and associated instances of the load balancer 124 on an additional computer 120A.

If loading of the load balancer 124 is determined to have decreased in block 308, then the load balancer monitor 104 determines the amount of computing resources needed to process the reduced load of service requests. One or more resource reduction thresholds for decreasing resource allocation (e.g., 40% utilization, 20% utilization, etc.) may be specified by a customer or other entity associated with the load balancer 124. If the resources utilized by the load balancer 124 to process the current level of loading do not exceed a resource reduction threshold, then the load balancer monitor 104 may ascertain that the amount of resources allocated to the load balancer 124 can be reduced. For example, the resources allocated to the load balancer may be halved if the resource utilization is less than 40% with respect to the currently allocated resources, or quartered if the resource utilization is less than 20% with respect to the currently allocated resources.

In block 314, the load balancer monitor 104 determines whether the amount of computing resources needed to process the reduced amount of service requests is greater than the amount of computing resources reserved for use by the load balancer 124. If the amount of computing resources needed to process the reduced amount of service requests is greater than the amount of computing resources reserved for use by the load balancer 124, then in block 316, the load balancer monitor 104 updates the parameters of the load balancer 124 stored in the data store 116 to reflect the deallocation of the resources from the load balancer 124, and adds an event flag to the event queue 112. The workflow server 110 detects the event flag and deallocates computing resources from the load balancer 124. For example, the workflow server 110 may remove from service one or more virtual machines 122A and associated instances of the load balancer 124, thereby freeing the computing resources associated with the deallocated instances of virtual machine 122A and load balancer 124 for other use in the web services platform 134.

If the amount of computing resources needed to process the reduced load of service requests is not greater than the amount of computing resources reserved for use by the load balancer 124, then in block 318, the load balancer monitor 104 maintains allocation of the reserved computing resources to the load balancer 124. If the computing resources currently allocated to the load balancer 124 are greater than the amount of computing resources reserved for use by the load balancer 124, then the load balancer monitor may update the parameters of the load balancer 124 stored in the data store 116 to reflect the deallocation of the resources greater than those reserved for use by the load balancer 124, and add an event flag to the event queue 112. The workflow server 110 detects the event flag and deallocates computing resources from the load balancer 124. For example, the workflow server 110 may remove from service one or more virtual machines 122A and associated instances of the load balancer 124, thereby freeing the computing resources associated with the deallocated instances of virtual machine 122A and load balancer 124 for other use in the web services platform 134. The computing resources reserved for use by the load balancer 124 continue to be allocated to the load balancer 124 even though a lesser amount of computing resources would be sufficient to process the request load. By maintaining allocation of the reserved computing resources to the load balancer 124, the load balancer 124 can provide timely processing of a rapidly increasing request load.

In various embodiments of the web services platform 134, some operations of the method 300 described as being performed by the load balancer monitor 104 may be performed by the workflow server 110 or another component of the web services platform 134.

Figure 4:
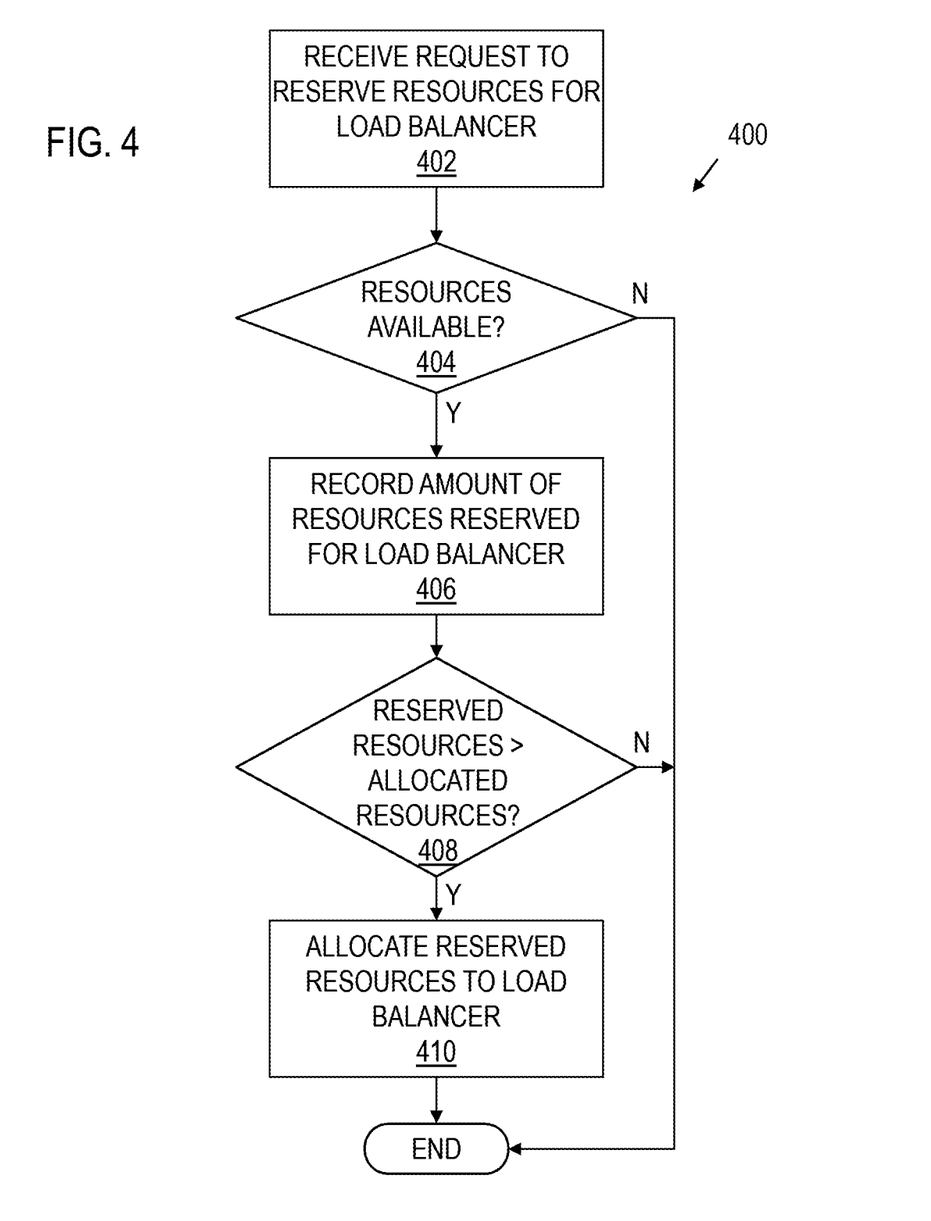
FIG. 4 shows a flow diagram for a method for reserving an amount of resources for use by a load balancer in accordance with various embodiments.

FIG. 4 shows a flow diagram for a method 400 for reserving an amount of resources for use by a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the web service platform 134.

In block 402, the API server 114 receives a request to reserve an amount of computing resources for use by the load balancer 124. The amount of computing resources to be reserved may be specified as a number of LCUs, where an LCU specifies a predetermined amount of processor capacity, memory, secondary storage, network bandwidth, and/or other computing resources. The request received by the API server 114 may be provided by the API requestor 132.

In block 404, the API server 114 determines whether the amount of computing resources requested to be reserved for use by the load balancer 124 is available for allocation to the load balancer 124. If the requested computing resources are not available for allocation to the load balancer 124, then, the amount of resources specified by the request are not reserved for use by the load balancer 124, and the load balancer 124 operates without reserved computing capacity.

If the amount of computing resources requested to be reserved for use by the load balancer 124 is available for allocation to the load balancer 124, then, in block 406, the API server 114 records the amount of computing resources that are reserved for use by the load balancer 124 in the data store 116 and adds an event flag to the event queue 112. The workflow server 110 detects the event flag, and, in block 408, determines whether the amount of computing resources allocated to the load balancer 124 is less than the amount of reserved computing resources reserved for use by the load balancer. If the amount of computing resources allocated to the load balancer 124 is less than the amount of reserved computing resources, then, in block 410, the workflow server allocates additional computing resources to the load balancer 124. For example, the workflow server 110 may instantiate, on a computer 120A, one or more additional virtual machines 122A and associated instances of the load balancer 124 to provide the reserved computing resources to the load balancer 124.

Figure 5:
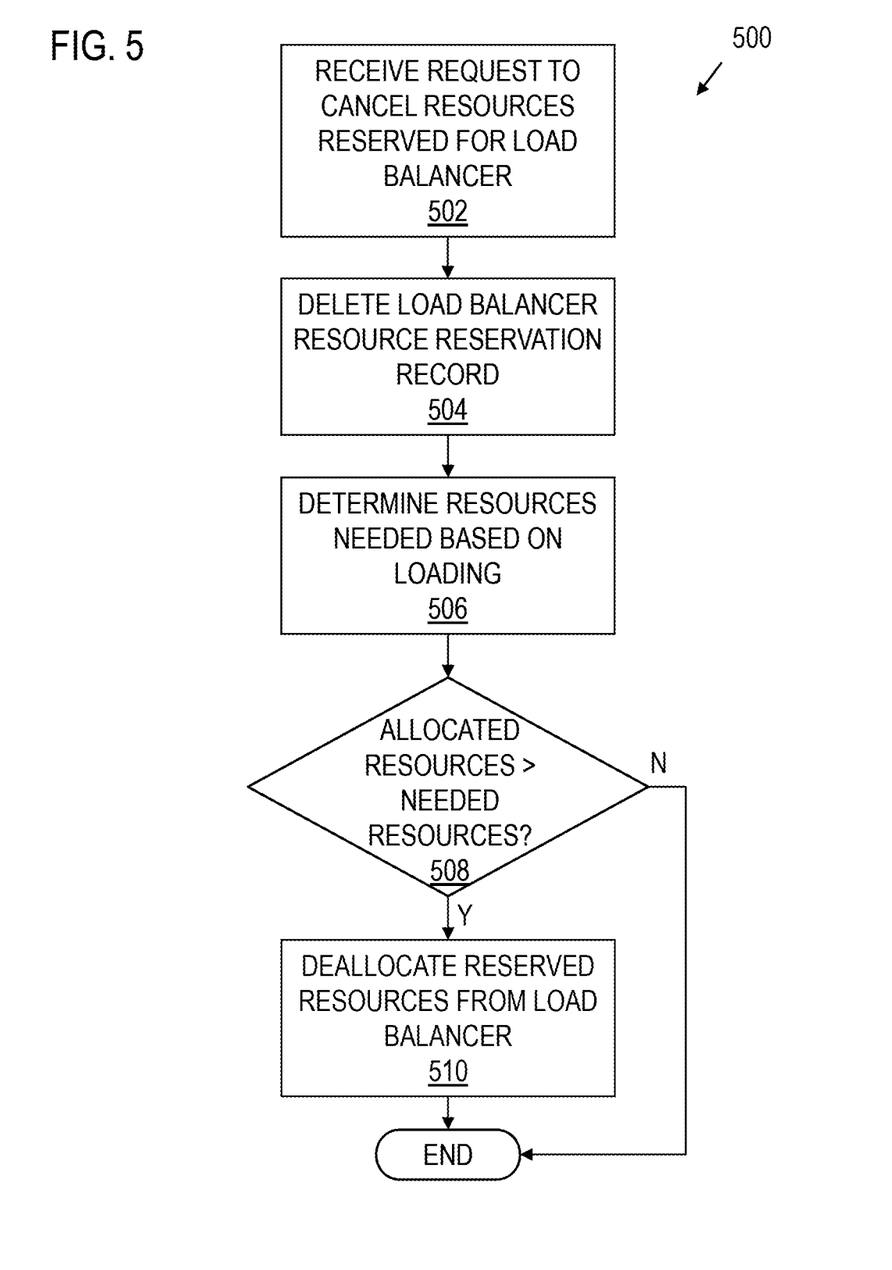
FIG. 5 shows a flow diagram for a method for cancelling reservation of an amount of resources allocated to a load balancer in accordance with various embodiments.

FIG. 5 shows a flow diagram for a method 500 for cancelling reservation of an amount of resources allocated to a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the web service platform 134.

In block 502, the API server 114 receives a request to cancel reservation of computing resources for use by the load balancer 124. Responsive to receipt of the cancellation request, the API server 114 provides an indication of the cancellation in the data store 116, and adds an event flag to the event queue 112. For example, in block 504, the API server 114 may delete a reservation record stored in the data store 116 that specifies an amount of computing resources to be reserved for use by the load balancer 124. In other embodiments, the API server 114 may set a flag in the data store 116 or provide other indication that no computing resources are to be reserved for use by the load balancer 124.

In block 506, the workflow server 110 detects the event flag and accesses the parameters of the load balancer 124 stored in the data store 116. The workflow server 110 identifies the indication that the load balancer computing resource reservation has been cancelled. Responsive to the cancellation, the workflow server 110 determines an amount of resources needed to process the current service request load in block 506. The workflow server 110 may determines the amount of resources needed to process the current service request load based on a most recent measurement of service request loading of the load balancer 124.

The reservation of computing resources for use by the load balancer 124 can cause the amount of computing resources allocated to the load balancer 124 to exceed the amount of computing resource needed to process a given service request load. In block 508, the workflow server 110 determines whether the amount of computing resources currently allocated to the load balancer 124 is greater than the amount of computing resources needed to process a current service request load. If the amount of computing resources currently allocated to the load balancer 124 is greater than the amount of computing resources needed to process the current service request load, then, in block 510, the workflow server deallocates unneeded (previously reserved) computing resources from the load balancer 124. For example, the workflow server 110 may remove from service one or more virtual machines 122A and associated instances of the load balancer 124, thereby freeing the computing resources of the computer 120A associated with the deallocated instances of virtual machine 122A and load balancer 124 for other use in the web services platform 134.

Figure 6:
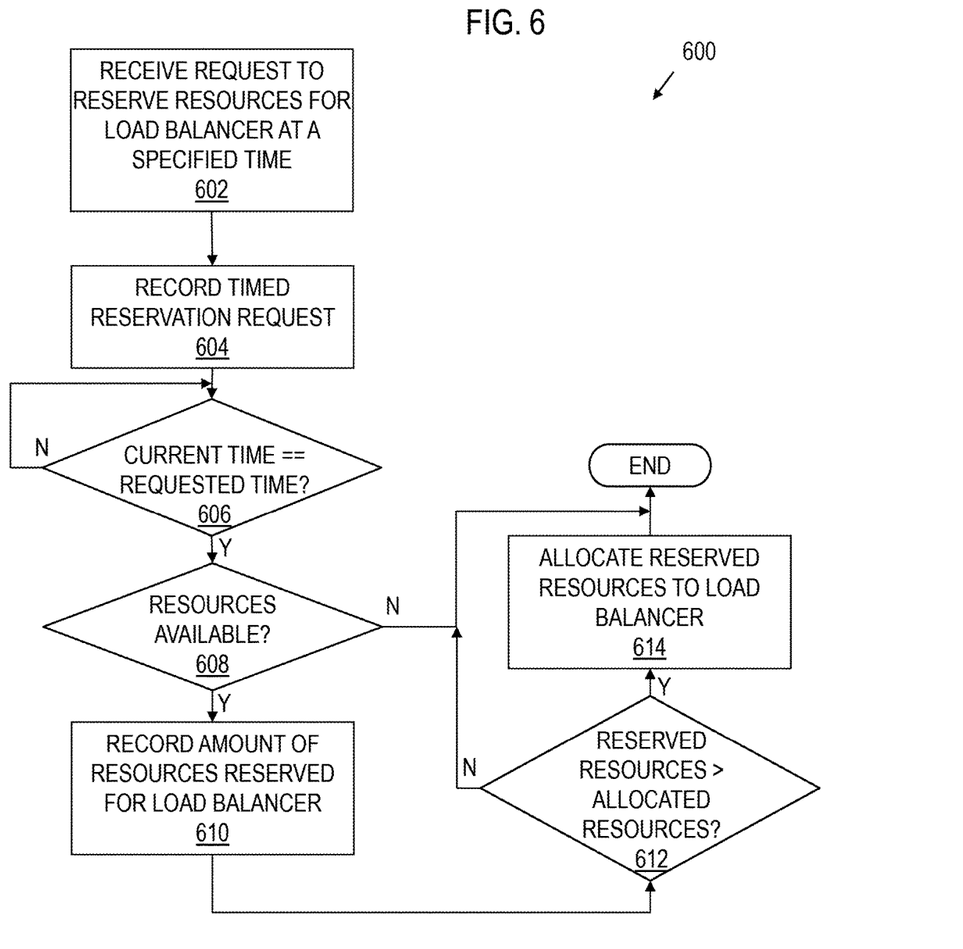
FIG. 6 shows a flow diagram for a method for scheduling allocation of an amount of reserved resources to a load balancer in accordance with various embodiments.

FIG. 6 shows a flow diagram for a method 600 for scheduling allocation of an amount of reserved resources to a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the web service platform 134.

In block 602, the API server 114 receives a request to reserve an amount of computing resources for use by the load balancer 124. The request also specifies a particular time at which the computing resources are to be reserved for use by the load balancer 124. The time may be intended to reserve resources for use by the load balancer 124 shortly before an abrupt increase in the request traffic from the clients 130 is expected. The amount of computing resources to be reserved may be specified as a number of LCUs, where an LCU specifies a predetermined amount of processor capacity, memory, secondary storage, network bandwidth, and/or other computing resources. The request received by the API server 114 may be provided by the API requestor 132.

In some embodiments, the request may also specify a time duration over which the amount of computing resources specified in the request are to be reserved for use by the load balancer 124. Alternatively, a time at which the amount of computing resources reserved for use by the load balancer 124 is to be deallocated from the load balancer 124 may be specified in the request. The request may further specify recurring allocation of the specified amount of computing resources for use by the load balancer 124. For example, the request may specify that the designated amount of computing resources is to be reserved for use by the load balancer 124 at a specified time (for a specified interval) on a particular day of each week (e.g., Friday from 5 PM to 11 PM).

In block 604, the API server 114 records the computing resource reservation request, including the reservation time and amount, in the data store 116. The API server 114 also adds an event flag to the event queue 112. The workflow server 110 detects the event flag, and reads the load balancer parameters from the data store 116. In block 606, the workflow server 110 determines whether the current time is the time at which the requested computing resources are to be reserved for use by the load balancer 124. If the workflow server 110 determines that the current time is the time at which the requested computing resources are to be reserved for use by the load balancer 124, then, in block 608, the workflow server 110 determines whether the amount of computing resources requested to be reserved for use by the load balancer 124 is available for allocation to the load balancer 124. If the requested computing resources are available for allocation to the load balancer 124, then, in block 610, the workflow server 110 may record the amount of resources reserved for the load balancer 124 in the data store 116.

In block 612, the workflow server 110 determines whether the amount of computing resources allocated to the load balancer 124 is less than the amount of computing resources reserved for use by the load balancer 124. If the amount of computing resources allocated to the load balancer 124 is less than the amount of computing resources reserved for use by the load balancer 124, then, in block 614, the workflow server allocates additional computing resources to the load balancer 124. That is, the workflow server 110 allocates additional computing resources to the load balancer, such that the total of computing resources allocated to the load balancer 124 is equal to the amount of resources reserved for use by the load balancer 124. For example, the workflow server 110 may instantiate one or more additional virtual machines 122A and associated instances of the load balancer 124 on a computer 120A to provide the reserved computing resources to the load balancer 124.

FIG. 7 shows a dialog 700 that displays measured load balancer resource utilization and allows entry of a load balancer resource reservation in accordance with various embodiments. The information provided in the dialog 700 shows how the load balancer 124 has utilized computing resources over time and allows for informed reservation of computing resources for use by the load balancer. The dialog 700 may be rendered as a web page displayed on the API requester 132 where the content of the dialog is transferred to the API requester 132 from the API server 114.

In the dialog 700, field 702 shows the name or identifier of the load balancer (e.g., load balancer 124) for which resource utilization information is displayed. A graph 704 of LCU utilization by the load balancer 124 is provided. The graph 704 shows LCUs utilized by the load balancer 124 over time. The number of LCUs utilized by the load balancer 124 at each point in time may be computed as per the method 200 disclosed herein.

Field 706 of the dialog 700 shows the maximum number of LCUs utilized by the load balancer 124 over a time interval (e.g., the life of the load balancer 124 or a selected time interval (a week, a month, etc.). For example, the maximum number of LCUs utilized by the load balancer 124 may correspond to the value at point 716 of the graph 704.

Field 708 of the dialog 700 shows a recommended number of LCUs to be reserved for use by the load balancer 124. The web services platform 134 may compute the recommended number of LCUs to reserve based on the maximum number of LCUs utilized by the load balancer 124 or a percentage thereof, an average of a number of the highest values of LCU utilization for the load balancer 124, etc.

Field 710 of the dialog 700 allows for enabling and disabling of reserved resources for the load balancer 124, and field 712 allows for entry of the number of LCUs to be reserved for use by the load balancer 124. The estimated cost of the computing resources specified in field 712 is shown in field 714.

Some embodiments of the dialog 700 may provide different and/or additional information for use in determining whether and how much computing resources are to be reserved for use by the load balancer 124. For example, some embodiments may display a graphical or other representation of an amount of computing resources allocated to the load balancer 124 and not used over time, i.e., a display of allocated computing resource headroom, and/or display minimum/maximum computing resource headroom available over a time interval. Some embodiments may display a measure of usage for each different type of computing resource over time. For example, memory used (e.g., gigabytes), processor capacity used (e.g., percentage of allocated processing capacity), network capacity used (e.g., number of transfers or amount transferred per time interval) over time may be presented.

Similarly, some embodiments may allow specification/entry of computing capacity to be reserved for use by the load balancer 124 in units other than LCUs. Some embodiments may allow entry of a value for each different type of computing resource. For example, an amount of memory, processor capacity, and network capacity to be reserved for use by the load balancer 124 may be respectively entered/specified in gigabytes, processor cores, and transfers per second, or other suitable units. Another embodiment may allow entry of an amount of traffic (e.g., requests per second, number of concurrent connections) that the load balancer 124 should be configured handle. Based on the amount of traffic specified, the web services platform 134 may determine an amount of resources (in LCUs or other units) to be reserved for use by the load balancer 124.

In some embodiments, the amount of resources to be reserved for use by the load balancer 124 may be specified as a multiplier that is applied to a historical resource use measurement (e.g., maximum measured resource use over time, average measured resource use over time, etc.). For example, three the times resources (e.g., maximum resources) used by the load balancer 124 over a time interval (e.g., the last month) may be reserved for future use by the load balancer 124 by entry of the value "3." Embodiments may also allow entry of a headroom value that specifies an amount of resources to be allocated to the load balancer 124 in addition to the amount of resources needed by the load balancer 124 to process the requests received at any given time. For example, if 10 LCUs of headroom are specified, then the number of LCUs allocated to the load balancer 124 will be adjusted, with the request load, to ensure that 10 LCUs of computing resources beyond the number of LCUs needed to process the current request load are reserved for use by the load balancer 124. That is, if processing the request load at time X requires 10 LCUs, then 20 LCUs may be reserved for use by the load balancer 124 at time X, while if the request load at time Y requires 15 LCUs, then 25 LCUs may be reserved for use by the load balancer 124 at time Y.

FIG. 8 shows a schematic diagram for a computing system 800 suitable for implementation of the web services platform 134, including the variable capacity load balancer 124 with reserved computing resources in accordance with various embodiments. The computing system 800 includes one or more computing nodes 802 and secondary storage 816 that are communicatively coupled via a network 818. One or more of the computing nodes 802 and associated secondary storage 816 may be applied to provide the functionality of the web services platform 134, including the load balancer 124, the management service 102, the load balancer monitor 104, the workflow server 110, the API server 114, the data store 116, the event queue 112, the application 126, etc.

Each computing node 802 includes one or more processors 804 coupled to memory 806, network interface 812, and I/O devices 814. In some embodiments of the system 100, a computing node 802 may implement the functionality of more than one component of the system 100. In various embodiments, a computing node 802 may be a uniprocessor system including one processor 804, or a multiprocessor system including several processors 804 (e.g., two, four, eight, or another suitable number). Processors 804 may be any suitable processor capable of executing instructions. For example, in various embodiments, processors 804 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 804 may commonly, but not necessarily, implement the same ISA. Similarly, in a distributed computing system such as one that collectively implements the web services platform 134, each of the computing nodes 802 may implement the same ISA, or individual computing nodes and/or replica groups of nodes may implement different ISAs.

The memory 806 may include a non-transitory, computer-readable storage medium configured to store program instructions 808 and/or data 810 accessible by processor(s)

804. The system memory 806 may be implemented using any suitable memory technology, such as static random access memory (SRAM), synchronous dynamic RAM (SDRAM), nonvolatile/Hash-type memory, or any other type of memory. Program instructions 808 and data 802 implementing the functionality disclosed herein re stored within system memory 806. For example, instructions 808 may include instructions that when executed by processor(s) 804 implement the load balancer 124, the management service 102, the load balancer monitor 104, the workflow server 110, the API server 114, the data store 116, the event queue 112, and/or other components of the web services platform 134 disclosed herein.

Secondary storage 816 may include volatile or non-volatile storage and storage devices for storing information such as program instructions and/or data as described herein for implementing the web services platform 134. The secondary storage may include various types of computer-readable media accessible by the computing nodes 802 via the network 818. A computer-readable medium may include storage media or memory media such as semiconductor storage, magnetic or optical media, e.g., disk or CD/DVD-ROM, or other storage technologies. Program instructions and data stored on the secondary storage 816 may be transmitted to a computing node 802 for execution by a processor 804 by transmission media or signals via the network 818, which may be a wired or wireless network or a combination thereof.

The network interface 812 may be configured to allow data to be exchanged between computing nodes 802 and/or other devices coupled to the network 818 (such as other computer systems, communication devices, input/output devices, or external storage devices). The network interface 812 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 814 may include one or more display terminals, keyboards, keypads, touchpads, scanning devices, voice or optical recognition devices, or any other devices suitable for entering or retrieving data by one or more computing nodes 802. Multiple input/output devices 814 may be present in computing node 802 or may be distributed on various computing nodes 802 of the system 800. In some embodiments, similar input/output devices may be separate from computing node 802 and may interact with one or more computing nodes 802 of the system 100 through a wired or wireless connection, such as over network interface 812.

Those skilled in the art will appreciate that computing system 800 is merely illustrative and is not intended to limit the scope of embodiments. In particular, the computing system 800 may include a combination of hardware or software that can perform the functions disclosed herein, including computers, network devices, internet appliances, PDAs, wireless phones, pagers, etc. Computing node 802 may also be connected to other devices that are not illustrated, in some embodiments. In addition, the functionality provided by the illustrated components may in some embodiments be combined in fewer components or distributed in additional components. Similarly, in some embodiments the functionality of some of the illustrated. components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing instructions that when executed on a computing system cause the computing system to:
   cause a network device to execute, the network device configured to process network traffic directed to an application running in a virtual machine hosted by a service provider;
   measure use, by the network device during operation, of types of the computing resources assigned to the network device; wherein the types of the computing resources measured comprise at least processor resources, storage resources, and network resources;
   determine, from the measured use of the types of the computing resources assigned to the network device, a maximum usage value of each of the types used by the network device;
   determine a minimum number of units of the computing resources needed to satisfy a greatest of the maximum usage values of the types; wherein each unit of the computing resources provides a predefined amount of each of the types of the computing resources and the predefined amount is different from an amount of the computing resource provided by a computing node configured to execute the network device; and change an amount of computing resources assigned to the network device to process the network traffic based on a change in the amount of computing resources needed.

2. The computer-readable medium of claim 1, wherein the instructions cause the computing system to maintain the amount of computing resources assigned to the network device at a predetermined reserved amount irrespective of the amount of computing resources needed being less than the predetermined reserved amount.

3. The computer-readable medium of claim 2, wherein the instructions cause the computing system to:

provide, to a management console that displays parameters of the network device, a value that identifies the minimum number of units; and receive, via an application programming interface or the management console, a resource request designating a specified number of the units of the computing resources to be reserved for use by the network device; wherein the specified number of the units designate a minimum amount of computing resources to be assigned to the network device irrespective of the amount of computing resources needed to process the service requests.

4. A system, comprising:

a plurality of computing nodes, each comprising a processor and memory coupled to the processor, wherein the computing nodes comprise:

a network device configured to receive traffic directed to an application; and a management service that allocates resources to the network device, the management service configured to:

measure usage of a plurality of different types of the resources by the network device; and determine, from the measured usage of the types of the computing resources assigned to the network device, a value of resource utilization for the network device, wherein the value is expressed according to a standard that represents all the different types of the resources and the value is selected based on one of the different types of the resources that is most highly utilized by the network device; wherein the standard quantifies the value by units wherein each unit provides a predefined amount of each of the different types of the resources and the predefined amount is different from an amount of the computing resources provided by a computing node configured to execute the network device;

determine an amount of the resources to be allocated to the network device based on the value of resource utilization; and allocate the amount of the resources to the network device.

5. The system of claim 4, wherein the different types of resources comprise processor resources, storage resources, and network resources; and wherein the management service is configured to:

determine a maximum utilization value, by the network device, for each of the different types of resources; and convert the maximum utilization value for each of the different types of resources to the value of resource utilization.

6. The system of claim 5, wherein the management service is configured to select the value of resource utilization for the network device as a largest of the maximum utilization values expressed according to the standard.

7. The system of claim 6, wherein the management service is configured to:

provide, to a management entity that specifies parameters of the network device, a parameter that identifies the value of resource utilization; and receive, via an application programming interface, a resource request designating a specified number of units of the resources to be reserved for use by the network device; wherein each of the units designate an minimum amount of each of the different types of the resources to be reserved for use by the network device.

8. The system of claim 7, wherein the management service is configured to:

determine whether the specified number of units of the resources is available in the system for allocation to the network device;

reserve the specified number of units of the resources for use by the network device.

9. The system of claim 7, wherein the management service is configured to compare, responsive to a change in measured loading of the network device, the specified number of units to a number of units needed to provide the amount of resources needed by the network device for processing the service requests.

10. The system of claim 7, wherein the management service is configured to:

receive, via the application programming interface, a resource request specifying cancellation of reservation of the units of the resources reserved for use by the network device; and cancel the reservation of the units of the resources reserved for use by the network device.

11. The system of claim 7, wherein the management service is configured to:

receive, via the application programming interface, a time value specifying a time at which the specified number of units of the resources are to be reserved for use by the network device;

reserve the specified number of the units of the computing resources for use by the network device at the specified time.

12. The system of claim 7, wherein the management service is configured to:

periodically:

measure use, by the network device during operation, of the different types of the resources assigned to the network device;

determine the maximum usage value of each of the different types; and determine a minimum number of units of the resources needed to satisfy the greatest of the maximum usage values of the different types;

record the periodically determined minimum numbers of units as a time series; and provide, to a management entity that specifies parameters of the network device, a value that identifies a largest value of the minimum number of units in the time series.

13. The system of claim 4, wherein the management service is configured to:

reduce an amount of the resources allocated to the network device based on a reduction in measured loading of the network device; and maintain allocation of a predetermined amount of the resources to the network device responsive to the measured loading indicating that less than the predetermined amount of the resources are needed to service the measured loading of the network device.

14. A method, comprising:

executing, by a computing system, a network device within a virtual machine;

receiving network traffic, by the network device, and providing the network traffic to an application;

varying an amount of resources allocated to the network device responsive to changes in loading of the network device due to changes in the service requests, wherein the resources allocated to the network device comprise a plurality of different types of computing resources;

measuring, by the computing system, usage of the different types of the computing resources by the network device;

quantifying, by the computing system, based on the measured usage, resource utilization by the network device as a function of a most highly used of the different types of the computing resources;

wherein the amount of resources assigned to the network device by the varying is based on the quantified resource utilization;

wherein the quantifying defines the resource utilization using a computing resource unit that specifies an amount of each of the types of computing resources that is different from an amount of the computing resource provided by a virtual machine executing the network device.

15. The method of claim 14, further comprising:

reducing the amount of the resources allocated to the network device based on a reduction in measured loading of the network device; and maintaining allocation of a predetermined amount of the resources to the network device responsive to the measured loading indicating that less than the predetermined amount of the resources are needed to service the measured loading of the network device.

16. The method of claim 14, further comprising:

determining a maximum measured utilization value, for the network device, for each of the different types of computing resources; and converting the maximum measured utilization value for each of the resources to a value expressed according to a computing resource unit that designates an amount of each of the different types of computing resources.

17. The method of claim 16, further comprising selecting the resource utilization by the network device to be a largest of the maximum measured utilization values expressed according to the computing resource unit.

18. The method of claim 16, further comprising:

providing, to a customer that specifies parameters of the network device, a value that identifies the resource utilization by the network device; and receiving, via an application programming interface a resource request specifying a designated a number of the computing resource units to be reserved for use by the network device; wherein the each of the units designate an amount of each of the different types of the resources to be assigned to the network device irrespective of the amount of computing resources needed to service the measured loading of the network device being less than the specified number of units.

19. The method of claim 18, further comprising:

determining whether the designated number of computing resource units is available in the computing system for allocation to the network device;

reserving the designated number of computing resource units for use by the network device.

20. The method of claim 18, further comprising comparing, responsive to a change in measured loading of the network device, the designated number of computing resource units to a minimum number of the computing resource units needed by the network device for distributing the service requests.

21. The method of claim 18, further comprising:

receiving, via the application programming interface, a resource request specifying cancellation of allocation of the designated number of computing resource units reserved for use by the network device; and cancelling allocation of the designated number of computing resource units to the network device.

22. The method of claim 18, further comprising:

receiving, via the application programming interface, a time value specifying a time at which the designated number of computing resource units is to be reserved for use by the network device;

allocating the designated number of computing resource units to the network device at the specified time.

* * * * *